(12) United States Patent
Kim

(10) Patent No.: US 6,298,301 B1
(45) Date of Patent: Oct. 2, 2001

(54) TRAFFIC INFORMATION SERVICING METHOD

(75) Inventor: Beom-seok Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/417,015

(22) Filed: Oct. 12, 1999

(30) Foreign Application Priority Data

Oct. 10, 1998 (KR) .................................................. 98-42435

(51) Int. Cl.$^7$ .............................. G06G 7/70; G01C 21/00
(52) U.S. Cl. ...................... 701/200; 701/117; 701/208; 701/209; 340/905; 340/907; 340/991; 340/993; 340/995
(58) Field of Search .................................... 701/201, 207, 701/208, 209, 117, 118, 119; 340/990, 995, 988, 903, 905, 904, 906, 907, 991, 993; 455/186.1, 161.3, 184.1

(56) References Cited

U.S. PATENT DOCUMENTS

| | | | |
|---|---|---|---|
| 5,182,555 | * | 1/1993 | Sumner ................................ 340/905 |
| 5,313,200 | * | 5/1994 | Sone ..................................... 340/905 |
| 5,402,117 | * | 3/1995 | Zijerdhand ........................... 340/905 |
| 5,428,544 | * | 6/1995 | Shyu ..................................... 701/117 |
| 5,712,632 | * | 1/1998 | Nishimura et al. .................. 340/995 |
| 5,864,305 | * | 1/1999 | Rosenquist .......................... 340/905 |
| 5,908,464 | * | 6/1999 | Kishigami et al. .................. 701/208 |
| 6,073,075 | * | 6/2000 | Kondou et al. ...................... 701/203 |
| 6,085,146 | * | 7/2000 | Kuribayashi et al. ............... 701/200 |
| 6,097,313 | * | 8/2000 | Takahshi et al. .................... 340/905 |
| 6,101,443 | * | 8/2000 | Kato et al. ........................... 701/210 |

FOREIGN PATENT DOCUMENTS

| | | | |
|---|---|---|---|
| 196 43 454 A1 | 4/1998 | (DE) | ................................ G08G/1/00 |
| 0 756 153 A2 | 1/1997 | (EP) | ............................. G01C/21/20 |
| 0 793 166 A2 | 9/1997 | (EP) | ................................. G06F/9/24 |
| 5-20578 | 1/1993 | (JP) | ............................. G08B/23/00 |
| 10-13258 | 1/1998 | (JP) | ................................ H04B/1/04 |
| 10-97694 | 4/1998 | (JP) | ................................ G08G/1/01 |
| 10-243438 | 9/1998 | (JP) | ................................ H04Q/7/22 |

* cited by examiner

Primary Examiner—Jacques H. Louis-Jacques
(74) Attorney, Agent, or Firm—Sughrue, Mion, Zinn, Macpeak & Seas, PLLC

(57) ABSTRACT

A traffic information servicing method for providing traffic information around a specific car in an undetermined area is provided. The traffic information servicing method includes a car navigation device communicating with an information center for providing traffic information according to received car information, a radio telephone, and an adaptor for controlling the radio telephone comprising transmitting the car information from the car navigation device to the information center; analyzing the car information received from the car navigation device; determining a predetermined number and order of map areas corresponding to the analyzed car information; and transmitting the predetermined number and order of map areas as traffic information to the car navigation device.

5 Claims, 4 Drawing Sheets

TRAFFIC INFORMATION SERVICING METHOD

BACKGROUND OF THE INVENTION

1. Field of the Invention

The present invention relates to a traffic information servicing method, and more particularly, to a traffic information servicing method for providing traffic information. The present application is based upon Korean Application No. 98-42435, which is incorporated herein by reference.

2. Description of the Related Art

In general, a terminal in a car receives general traffic information from a traffic information providing system. For example, a traffic information providing system such as the VICS (vehicle information and communication system) and the DARC (data radio channel) is not for a specific car, and transmits previously collected traffic information of an unspecific area to an unspecific car by voice and data.

FIG. 1 shows a traffic information service system using a conventional VICS.

A first VICS center 130 of area A and a second VICS center 120 of area B exists in a VICS area 110. The first VICS center 130 transmits traffic information collected in the area A in the form of data to a car navigation terminal 140 built in a car through a FM broadcast. The car navigation terminal 140 receives the information of the area A through the FM broadcast and can use the received information as visible information.

As mentioned above, the VICS transmits the collected traffic information of the specific area in the form of data to a general user through the FM broadcast. A user who has the system can use the traffic information of the relevant area.

However, only unidirectional communication can be performed in the VICS. Enormous expenses and much installation time are spent on collecting the traffic information, establishing the VICS center, respective terminal manufacturers and VICS center managers, and establishing a VICS data format. It is difficult for a car in the area A to obtain the traffic information of the area B since only the traffic information of the specific area is provided.

SUMMARY OF THE INVENTION

It is an objective of the present invention to provide a traffic information servicing method for conveniently receiving desired traffic information by a user by transmitting and receiving data between a navigation device installed in a car and an information center.

Accordingly, to achieve the above objective, there is provided a traffic information servicing method including a car navigation device communicating with an information center for providing traffic information according to received car information, a radio telephone, and an adaptor for controlling the radio telephone comprising transmitting the car information from the car navigation device to the information center; analyzing the car information received from the car navigation device; determining a predetermined number and order of map areas corresponding to the analyzed car information; and transmitting the predetermined number and order of map areas as traffic information to the car navigation device.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Hereinafter, a preferred embodiment of the present invention will be described with reference to the attached drawings.

Figure 1:
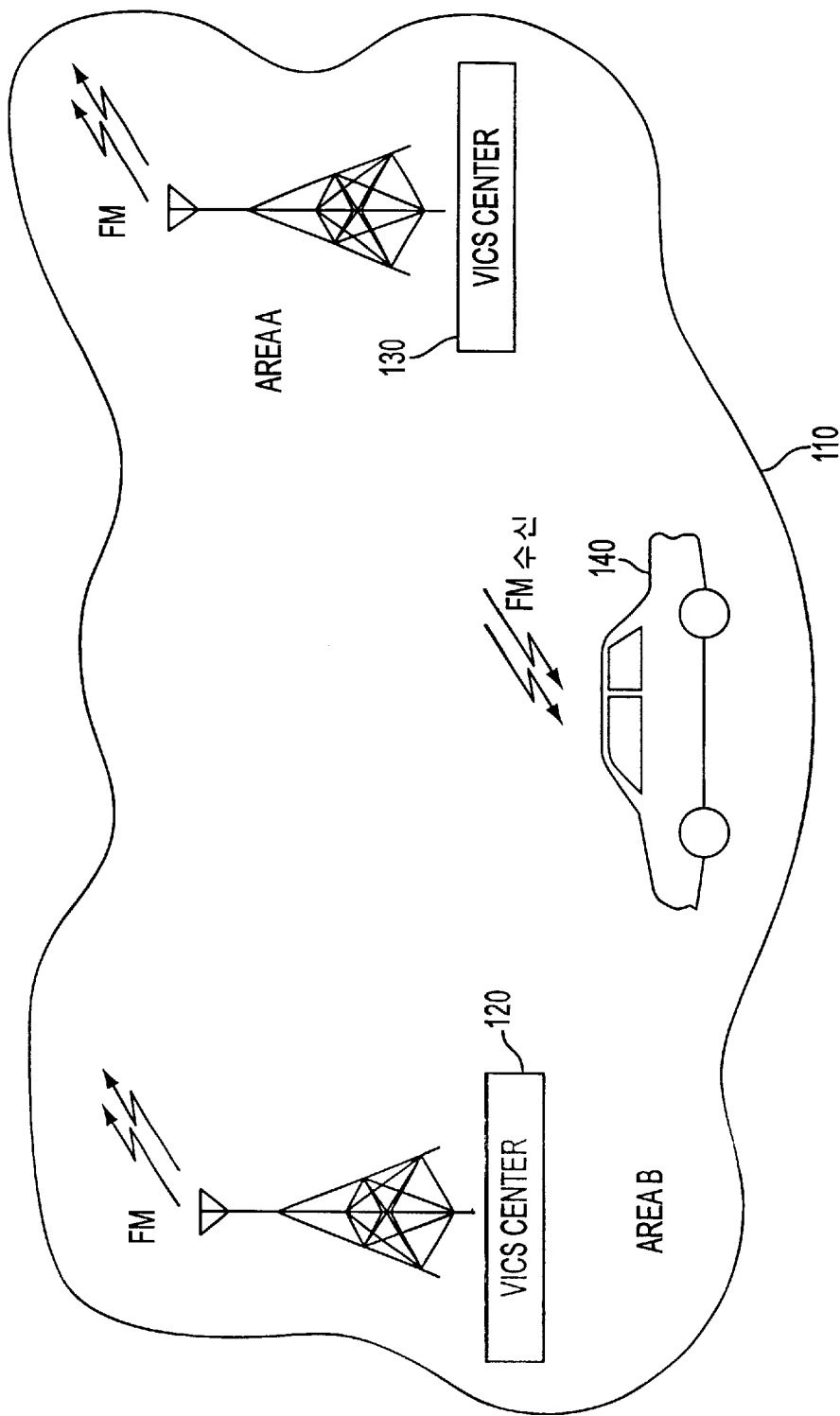
FIG. 1 shows a traffic information service system using a conventional VICS.
Figure 2:
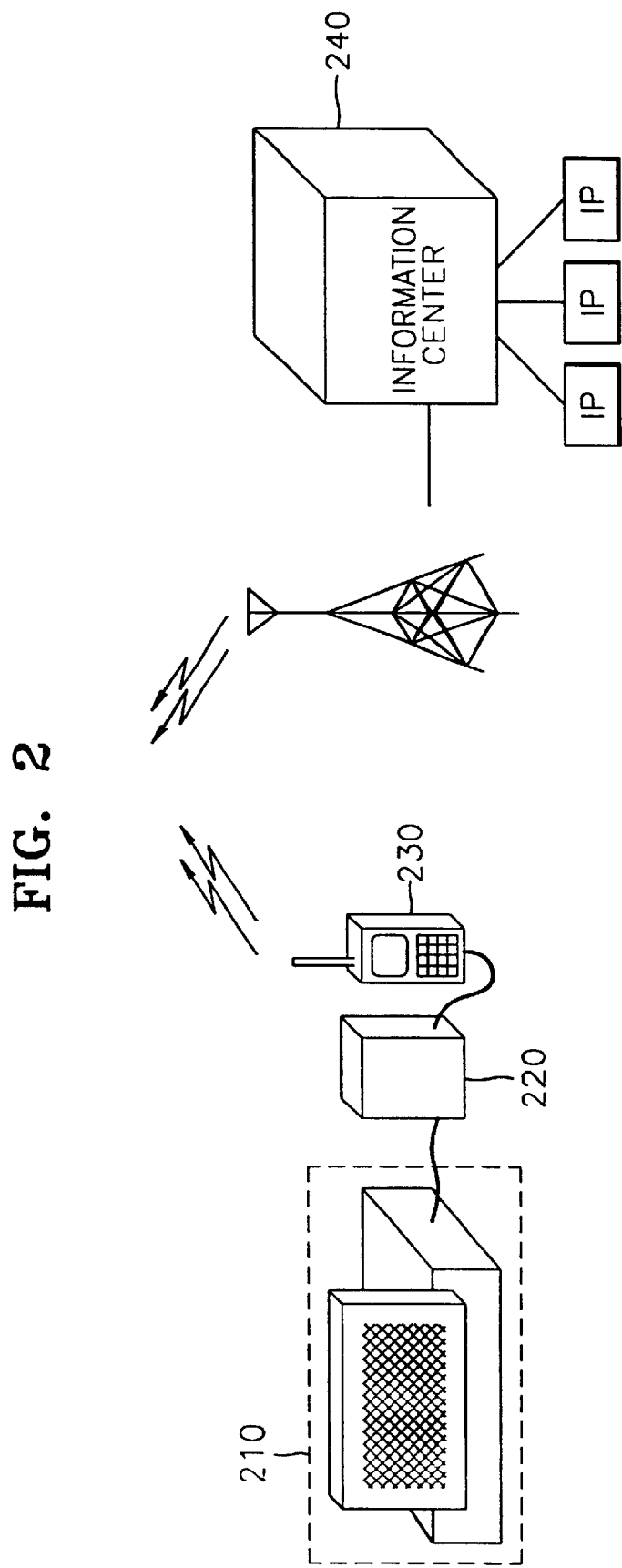
FIG. 2 shows the structure of a traffic information service system according to the present invention.

FIG. 2 shows the structure of a traffic information servicing system according to the present invention.

A car navigation device 210 connected to an adaptor 220 and a radio telephone 230 transmits car information to an information center 240, and receives various items of information on daily living and traffic information from the information center 240. The information center 240 receives the various items of information on daily living and traffic information from a plurality of information providers (IPs). A car navigation device 110 to be displayed processes the received information as information desired by a user. The IPs collect information on daily living such as news, stock quotes, weather, e-mail and traffic information such as traffic congestion, traffic accidents, and road conditions of a specific area, and provide the collected information to the information center 240.

When a user operates the car navigation device 210 and wishes to obtain traffic information, the car navigation device 210 requests the adaptor 220 to telephone the information center 240. The adaptor 220 controls the radio telephone 230 so that communication between the information center 240 and the car navigation device 210 can be performed. When the connection is completed by the adaptor 220, the car navigation device 210 transmits car information, e.g., the current location of the car, to the information center 240 and requests the traffic information of the area. The information center 240 recognizes the location of the car received from the car navigation device 210 and transmits specific traffic information around the car to the car navigation device 210 in a predetermined order.

Figure 3:
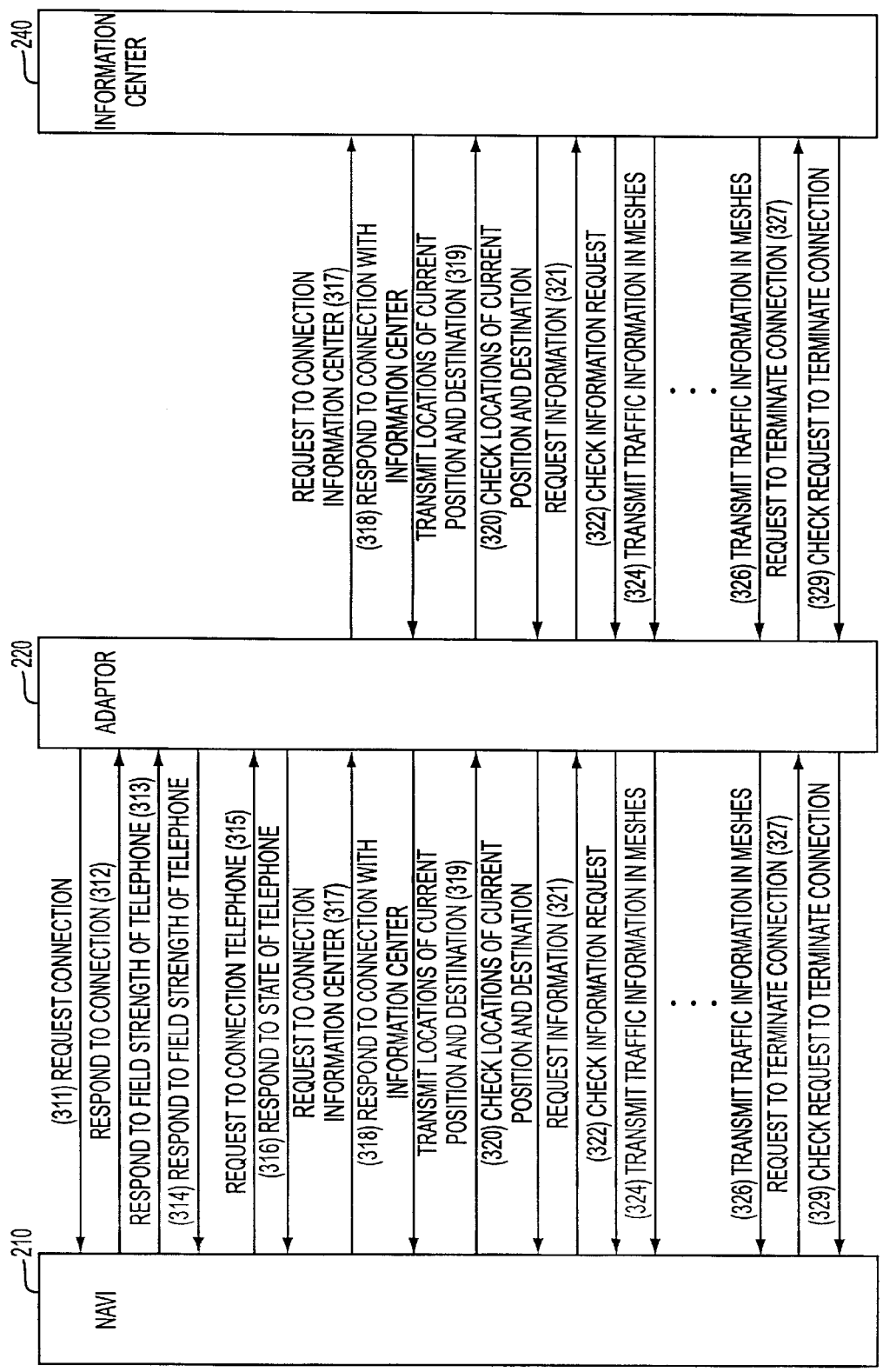
FIG. 3 is a flowchart showing a traffic information servicing method including the system of FIG. 2.

FIG. 3 is a flowchart showing a traffic information servicing method including the system of FIG. 2.

The adaptor 220 requests connection with peripheral devices so that the car navigation device 210 is communicable in step 311. The car navigation device 210 transmits a connection response signal to the adaptor 220 in step 312. The car navigation device 210 requests a field strength of the radio telephone 230 to the adaptor 220 in step 313.

The adaptor 220 displays the field strength of the radio telephone 230 on the screen of the car navigation device 210 so that the user can make a telephone call in step 314. The car navigation device 210 requests connection with the radio telephone 230 to the adaptor 220 in order to receive traffic information and information on daily living in step 315. The adaptor 220 announces a state of the radio telephone 230, i.e., whether a service can be performed and a power on/off state to the car navigation device 210 in step 316.

The car navigation device 210 moves to an information request screen when the radio telephone 230 is determined to be in a state in which service can be performed through the adaptor 220, and requests connection with the information center 240 when the user requests specific information in step 317. The information center 240 analyzes the identifier (ID) of the user when the connection request is received and transmits whether the connection can be performed to the car navigation device 210 in step 318. The car navigation device 210 transmits car information, i.e., the current location of the car and information on cars around the car, to the information center 240 in step 319. Here, the car information includes speed, location, direction, software version, and map version. The information center 240 checks the current location and a destination location by the car information received from the car navigation device 210 and transmits the traffic information to the car navigation device 210 in step 320.

Figure 4:
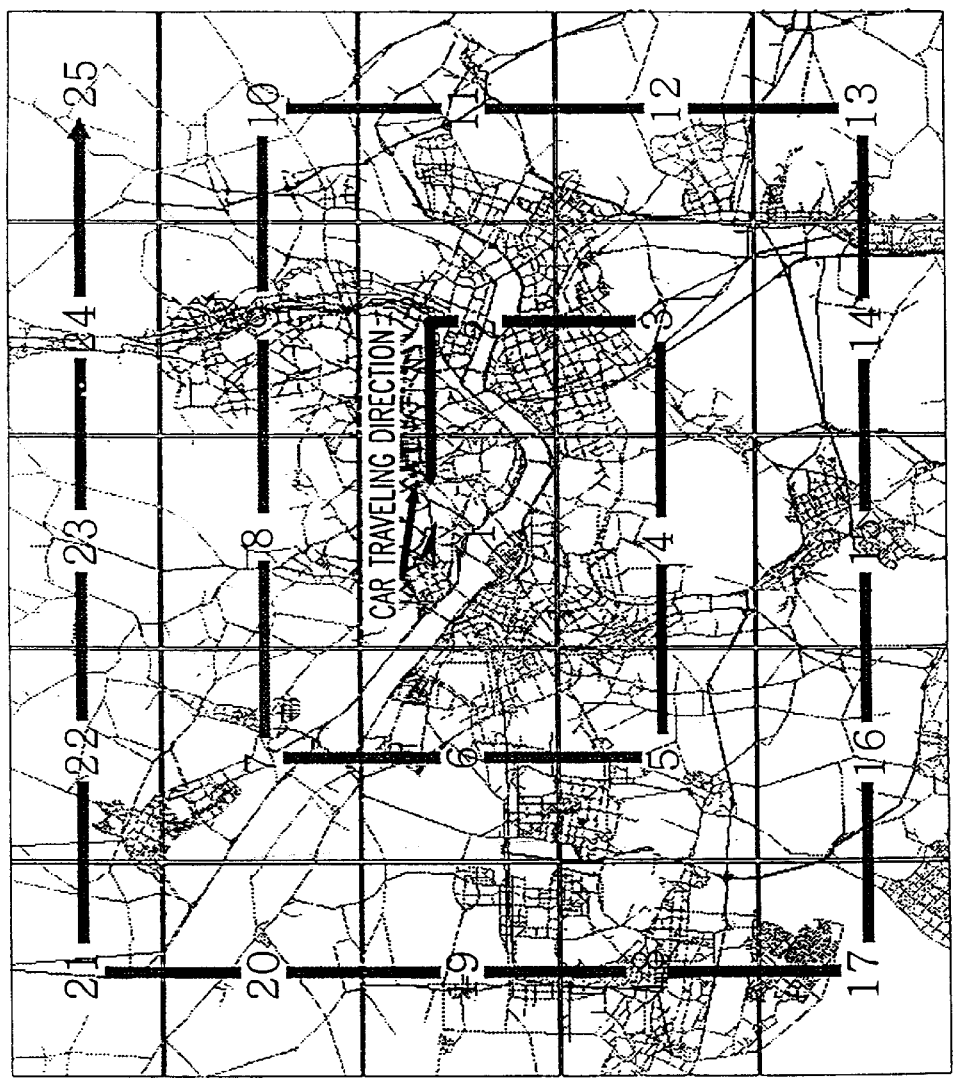
FIG. 4 shows an example of map information for servicing traffic information.

When the car navigation device 210 requests traffic information from the information center 240 through the adaptor 220 in step 321, the information center 240 transmits a traffic information request check signal to the car navigation device 210 in step 322. The information center 240 analyzes the locations and traveling directions of other cars using various items of information on the cars received from the car navigation device 210. The information center 240 transmits traffic information in predetermined meshes corresponding to the location of the car, i.e., the traffic information in which the number and order of the meshes are determined, to the car navigation device 210 in steps 324 through 326. Here, a mesh is a unit of map area obtained by dividing a map downward, and across. As shown in FIG. 4, when the number of meshes of a region to which the traffic information is to be provided, i.e., 25, the 25 areas are transmitted in a determined order. For example, in FIG. 4, when the traveling direction of the car is southeast, east is a first direction and south is a second direction.

Referring to FIG. 4, when the traveling direction of the current car is southeast, the information center 240 transmits: 1) a first mesh (No.1) including coordinates of the car, 2) a second mesh (No.2) in a first traveling direction of the car adjacent to the first mesh, 3) a third mesh (No. 3) in a second traveling direction of the car adjacent to the second mesh, and 4) additional meshes (Nos. 4, 5, 6, . . . ) in a spiral order after the third mesh.

When the car navigation device 210 completes receiving the traffic information in step 327, the car navigation device 210 requests to terminate connection with the information center 240. Continuously, the information center 240 transmits a connection termination request check signal to the car navigation device 210 in step 329.

As mentioned above, according to the present invention, it is possible to transmit and receive information on daily living or traffic information since a bi-directional communication can be performed. Although the user can request to stop transmission in a desired time, received information is effective. Moreover, only information of the received part is displayed, and the user can reduce fees such as telephone charges by receiving the traffic information only for the relevant time. When a destination is set in the navigation device, it is possible to transmit the current location and the location of the destination to the traffic information center. Therefore, it is possible to receive information on the current location and the traffic information desired by the user.

Having described the invention in detail and by reference to the drawings, it will be apparent that modification and variations are possible without departing from the scope of the invention. Therefore, it is intended that the invention not be limited by the precise structure shown and described, but rather the full scope of the invention as defined in the following claims.

What is claimed is:

1. A traffic information servicing method including a car navigation device communicating with an information center for providing traffic information according to received car information, a radio telephone, and an adaptor for controlling said radio telephone, comprising:

transmitting said car information from said car navigation device to said information center;

analyzing said car information received from said car navigation device;

determining a predetermined number and order of map areas corresponding to said analyzed car information; and transmitting said predetermined number and order of map areas and said traffic information to said car navigation device.

2. The traffic information servicing method of claim 1, wherein said car information includes speed, location, car traveling direction, car emergency state, software version, and map version.

3. The traffic information servicing method of claim 1, wherein said car navigation device transmits said car information to said information center and receives traffic information on a map area around said car.

4. The traffic information servicing method of claim 1, wherein said information center receives said car information from said navigation device and transmits traffic information for a map area including said car to an adjacent map area of the car's traveling direction.

5. The traffic information servicing method of claim 4, wherein said information center transmits 1) a first map area including coordinates of said car, 2) a second map area in a first traveling direction of said car adjacent to said first map area, 3) a third map area in a second traveling direction of said car adjacent to said second map area, and 4) additional map areas in a spiral order after said third map area.

* * * * *